United States Patent

Lewis et al.

[11] 3,919,028
[45] Nov. 11, 1975

[54] METHOD OF MAKING UNIDIRECTIONAL WEBBING MATERIAL

[75] Inventors: Albert Lewis, Covina; Ronald G. Krueger, Azusa, both of Calif.

[73] Assignee: Kaiser Glass Fiber Corporation, Oakland, Calif.

[22] Filed: Sept. 13, 1972

[21] Appl. No.: 288,793

[52] U.S. Cl.............. 156/148; 28/75 R; 57/167; 57/140 G; 139/383 R; 139/420 C; 139/426 R; 156/178; 156/181; 156/296; 156/306; 156/313; 428/258; 428/259
[51] Int. Cl.² ........................ D03D 13/00
[58] Field of Search .......... 156/178, 305, 148, 306, 156/180, 181, 166, 176, 177, 201, 296, 313; 161/88, 91, 93, 96, 140, 142, 143, 144, 150, 175, 50, 51, 75, 146; 139/420 C, 420 R, 426, 129, 383; 28/75 R, 72.6, 73; 57/167, 140 G

[56] References Cited
UNITED STATES PATENTS

| | | |
|---|---|---|
| 2,321,512 | 6/1943 | Protz .................................. 161/143 |
| 2,887,132 | 5/1959 | Manning et al. ................ 139/420 C |
| 3,095,338 | 6/1963 | Romanin ............................ 161/142 |
| 3,275,489 | 9/1966 | Jalv .................................... 156/181 |
| 3,390,037 | 6/1968 | Christie .............................. 156/148 |
| 3,457,739 | 7/1969 | Frand et al. ..................... 139/420 R |
| 3,526,565 | 9/1970 | Walter ................................ 156/181 |
| 3,573,130 | 3/1971 | Vinton et al. ...................... 156/305 |
| 3,639,195 | 2/1972 | Sanders .............................. 156/148 |
| 3,654,056 | 4/1972 | Nisbet et al. ...................... 161/175 |

*Primary Examiner*—Charles E. Van Horn
*Assistant Examiner*—F. Frisenda
*Attorney, Agent, or Firm*—Naylor, Neal & Uilkema

[57] ABSTRACT

Improved unidirectional webbing material having a low warp to fill weight ratio and comprised of specially coated and spaced generally parallel warp or carrier strands of a synthetic fiber such as fiber glass interwoven with and securely bonded to spaced groupings of glass fiber weft (fill) elements to provide a distortion resistant and rugged fabric useful for the reinforcement of molded plastic articles and the like.

4 Claims, 11 Drawing Figures

U.S. Patent  Nov. 11, 1975  Sheet 1 of 2  3,919,028
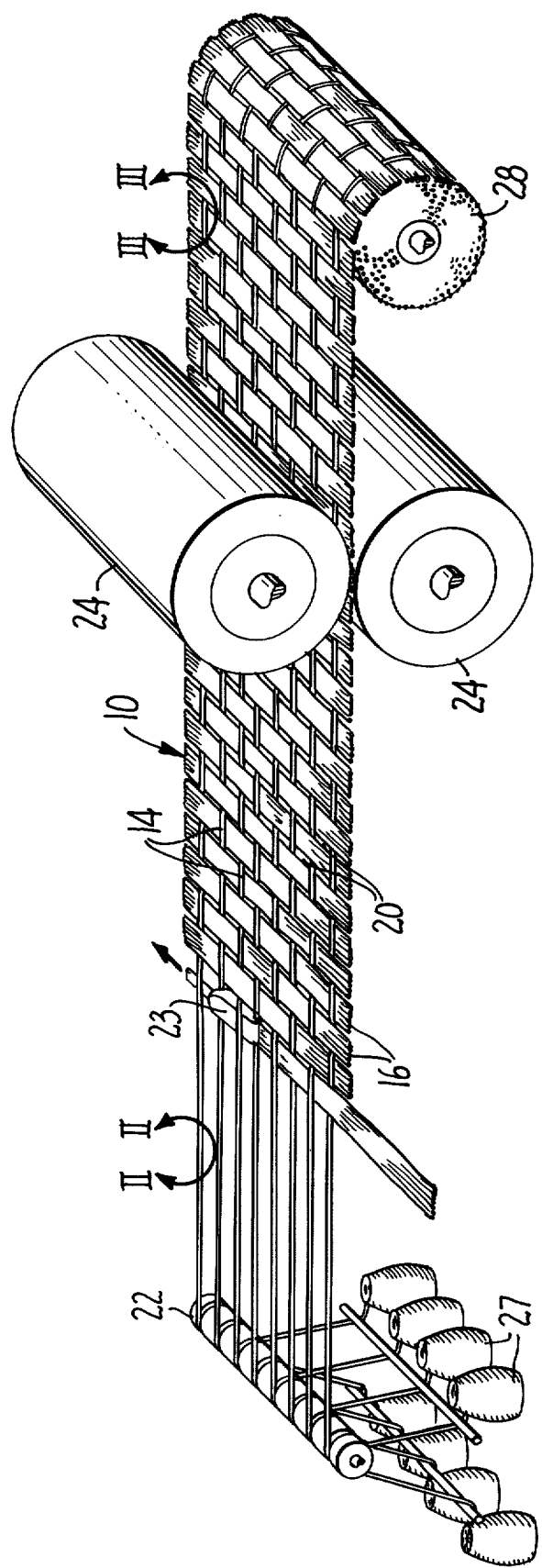
FIG. I.
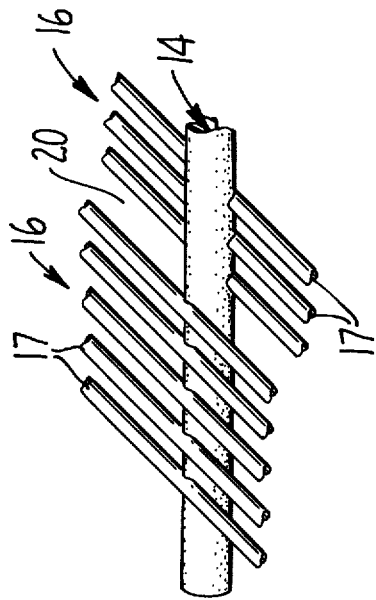
FIG. III.
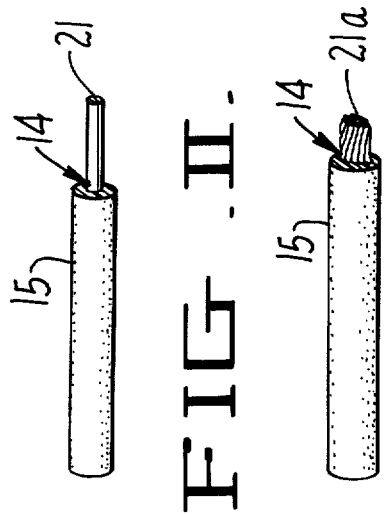
FIG. II.  FIG. IIA.

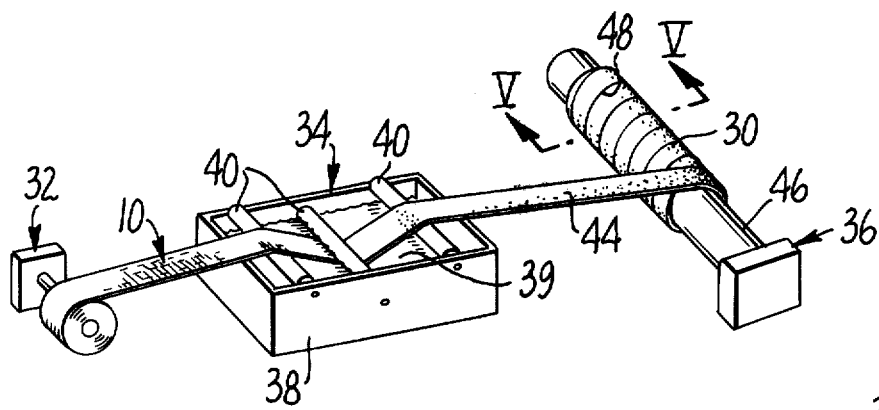
FIG. IV.
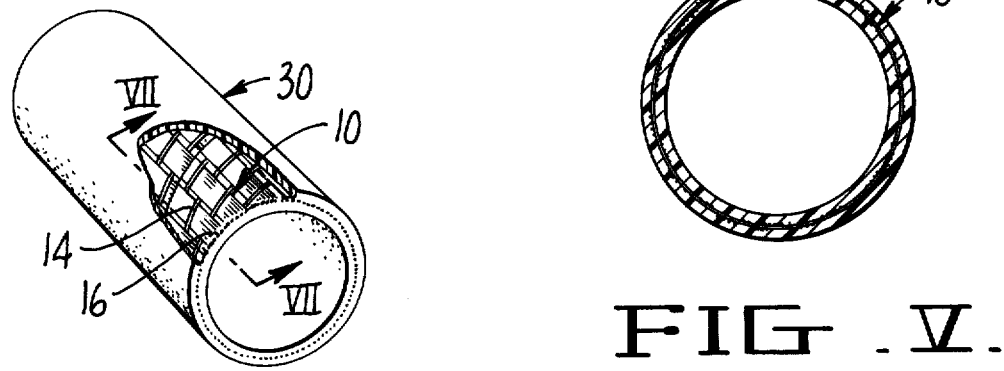
FIG. VI.   FIG. V.
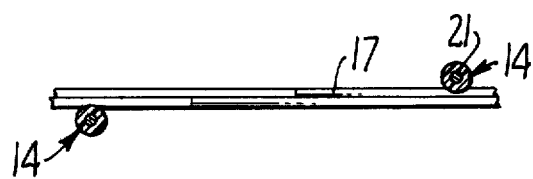
FIG. VII.
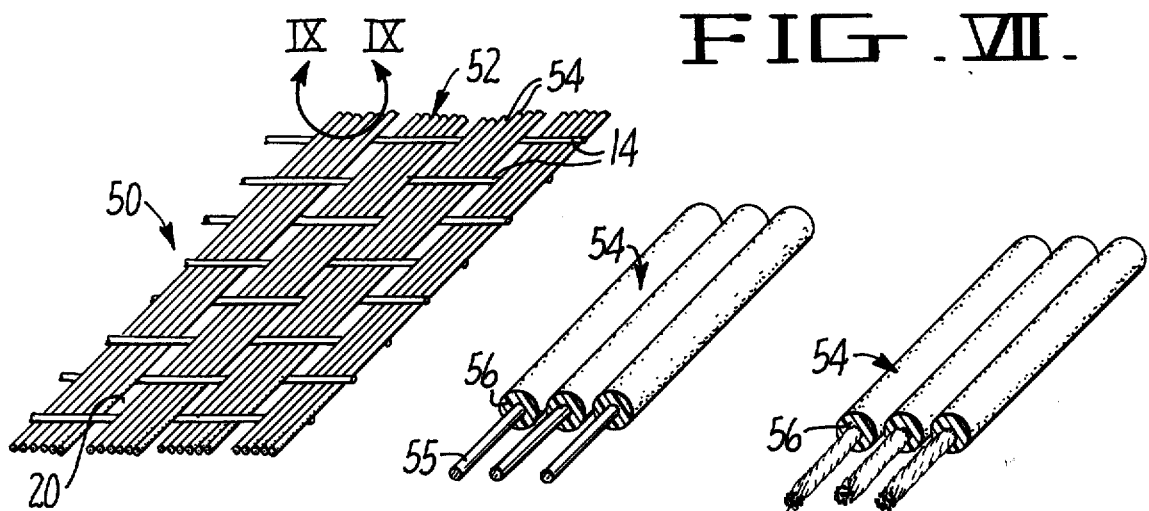
FIG. VIII.   FIG. IX.   FIG. IXA.

METHOD OF MAKING UNIDIRECTIONAL WEBBING MATERIAL

BACKGROUND OF THE INVENTION

This invention relates to woven unidirectional synthetic fiber webbing materials used in the reinforcement of molded plastic articles and the like. More particularly, it is concerned with providing an improved woven unidirectional and relatively pliant glass fiber webbing material of a low warp weight to fill weight ratio that can be used as a reinforcement in molded plastic articles of both simple and complex shape.

Webbing materials of the type under consideration are generally exemplified by such U.S. Pat. Nos. as 2,266,761; 2,769,222; 2,771,659 and 2,887,132. Traditionally, if a weaver were to prepare woven webbing material, and particularly webbing of fiber glass with a low warp weight to fill weight ratio, the fabric would have high fabric distortion characteristics and literally fall apart. For this reason, prior art unidirectional webbings of glass fiber usually had a high warp to fill weight ratio as evidenced by U.S. Pat. No. 2,887,132. When, however, the bulk of the fibers constituted the warp strands, the woven fabric or tape lacked the pliability required for many applications and had but limited utility even though glass fiber tapes ordinarily provide excellent reinforcing materials. On the other hand, woven fabrics of synthetic materials having low warp to weft or fill weight ratio are exceptionally plicable and can be readily used for numerous applications not available to fabrics of high warp weight to fill weight ratios, provided the distortion problem can be corrected.

The high distortion characteristics usually attendant with woven fabrics of synthetic materials having a low warp to fill weight ratio is avoided in the woven fabric or webbing materials of the instant invention by selectively coating the warp strands with an appropriate chemical coating of relatively uniform thickness that serves to bond or mechanically lock the various fill or weft strands to the warp strands after the fabric is woven so that the finished fabric will be relatively distortion resistant. Depending upon the particular chemical composition of the coating, the bonding of the warp strands to the fill strands can be effected by various methods or techniques, such as by heat, moisture, the use of organic solvents, or contact pressures. Avoidance or minimization of high distortion in a woven unidirectional glass fiber fabric having a low warp to fill weight ratio means that the fabric can advantageously be used as a reinforcing tape that can be handled by standard production equipment without falling apart and, at the same time, be pliable enough to take various shapes and be readily integrated in molded plastic articles of complex and intricate shape.

SUMMARY OF THE INVENTION

It is a primary purpose of the instant invention to provide an improved unidirectional woven textile fabric or tape of synthetic fibers, and in particular glass fibers, having a very low warp to fill weight ratio. For example, the fabric can be such that at least 90% or more of the fabric weight is in the fill direction. The fabric has excellent distortion resistance despite the aforesaid warp to fill weight ratio and is sufficiently pliable so that it can be used in various kinds of plastic reinforcement applications where complex shapes are involved without falling apart and while being handled by standard production equipment. These advantageous results are obtained by appropriately coating the warp strands of glass fiber or other synthetic fiber with a suitable chemical bonding coating, preferably prior to weaving, so that the warp strands can be firmly bonded or mechanically locked to the fill strands or groupings of fill strands or elements after the fabric is woven.

It is an object of the present invention to provide an improved method for forming unidirectional webbing material.

BRIEF DESCRIPTION OF THE DRAWINGS

FIG. I is an overall schematic and perspective view, with parts broken away, of a typical production line for continuously forming the distortion resistant glass fiber tape or webbing of the instant invention;

FIG. II is an enlarged fragmentary perspective view with parts broken away taken within the bounds of encompassing line II of FIG. I and showing a coated warp strand section wherein the strand is of monofilament construction;

FIG. IIA is a view similar to FIG. II showing a coated warp strands section wherein the strand is of multifiber construction;

FIG. III is an enlarged perspective view of a section of webbing taken within the limits of circumscribing line III of FIG. I and shows a warp strand bonded or mechanically locked to one or more filler strands at their points of intersection;

FIG. IV is a perspective view of a typical production line for seamless plastic pipe and illustrates the manner of winding the distortion resistant webbing or tape of the present invention about, and as a part of, the wall of a seamless plastic pipe;

FIG. V is an enlarged cross-sectional view taken along line V—V of FIG. IV and illustrates certain details of the wall structure of the pipe being manufactured by the equipment of FIG. IV;

FIG. VI is an enlarged and partly broken away perspective view of a length of pipe as shown in FIG. IV embodying the webbing of the present invention;

FIG. VII is an enlarged cross-sectional view taken generally along line VII—VII of FIG. VI with parts removed and illustrates certain details of the interlocked warp and filler strands of the reinforcing webbing;

FIG. VIII is a perspective view of a modified form of webbing;

FIG IX is an enlarged fragmentary perspective view of the webbing of FIG. VIII as taken within the circumscribing line IX thereof showing a coated weft or fill element construction wherein the elements are of monofilament construction; and FIG. IXA is a view similar to FIG. IX showing a coated weft or fill element construction wherein the elements are multi-fiber construction.

DETAILED DESCRIPTION

With further reference to the drawings and in particular FIGS. I–III, the unidirectional distortion resistant and somewhat retiform woven fabric webbing or tape 10 of the instant invention is generally made up of synthetic fibers, e.g. glass fibers arranged as singular and widely spaced glass fiber warp strands 14 and bundles or groupings 16 of individual glass fiber weft or fill strands or elements 17 interlaced and criss-crossed with the warp strands 14.

Prior to the weaving operation, at least certain and preferably all the parallel and spaced warp or carrier strands 14 that run the length of the webbing or tape 10 are advantageously surface treated or covered with a suitable coating 15 preferably uniformly applied to the strands 14 along their full length. The coating 15 to be described more fully hereinafter advantageously acts as a bonding medium for anchoring the individual glass fiber fillers or weft strands 17 to the warp strands 14 in cross wise relationship or at a bias to the warp strands.

In the preferred embodiment of the invention, the bundles 16 are selectively spaced from each other by a suitable gap or distance so that interstices or apertures 20 exist between the bonded together warp and weft elements 14 and 17 and the webbing is somewhat open and net-like in structure. This net-like or retiform structure enhances the flexibility and pliability characteristics of the fabric without adversely affecting the overall yield and tensile strengths of the webbing for most applications.

The individual glass fiber warp strands 14 can be of monofilament construction 21 as shown in FIG. II, or each be made up of an appropriate number of helically twisted-together singular fiber glass filament 21a, as shown in FIG. IIA. The individual strands 17 of the bundles 16 may similarly be of monofilament or twisted strand construction.

The bonding coating 15 is substantially uniformly applied to the warp strands 14 along their entire lengths and should be fully compatible with whatever surface coating or sizing is present on the weft or filler strands 17. This is important because in a typical end use application the filler strands 17 are treated or coated with a surface treatment or sizing that is designed to provide full compatibility between the filler strands and the plastic composite article, (e.g. a pipe or tube in which the webbing 10 is incorporated for reinforcement purposes).

Coating 15 can be made of natural or man-made polymers, copolymers, waxes and mixtures thereof. Representative examples include, without limiting the scope of use to those recited, styrene, butadiene, polybutadiene, polyvinylchloride, polyethylene, polypropylene, polyvinyl acetate (plasticized), acrylics, polyvinyl pyrrolidene compounds, natural latex, paraffin wax of the hot melt type, casein, carboxy cellulose esters and ethers.

In the illustrated system shown in FIG. I the appropriately coated warp strands are drawn over a guide 22, woven with the fill elements at a shuttle 23, and then heated and pressed together through a set of heated rollers 24. The desired temperature range during heating is on the order of 225°–375°F. or as high as 500°F. depending on the specific coating compound used. For all practical purposes, 500°F. is the usual upper limit because at this temperature conventional sizings on the fill strands ordinarily start to decompose. A practical lower limit is around 150°F. because below this temperature many coatings have a tendency to self-block or adhere to themselves, causing a non-uniform coating thickness and other problems.

In addition to heat bonding of the warp coating 15 to filler strands 17, this bonding of warp strands can be effected by other methods depending upon the particular chemical composition of coating 15. For example, it can be done by mixture, the use of organic solvents, or contact pressure provided that at the same time such treatment does not adversely affect the surface or sizing coating on the fill elements and possible destroy the compatibility between the fill elements and the plastic composite that the fill material is to reinforce. Because of this desired compatibility it is important that the coating on the fill elements not be deleteriously affected by any warp to fill bonding process to be used.

Because of the different types of coatings 15 that can be used to practice the instant invention for the purposes of this application the term "blockable" shall be used in the specification and claims to designate a coating 15, regardless of its particular composition, that is capable of bonding fill elements 17 to warp strands 14 when it has solidified. Such a coating when applied to a warp strand can be either in the form of a viscous liquid, a paste, a plastic material or a waxy substance and upon hardening or finally solidifying mechanically bonds the warp strands 14 to the filler elements 17 naturally, or under the influence of heat or through a chemical cure of the material.

In all of the bonding techniques mentioned, namely: heat, moisture, solvent and contact bonding, pressure rollers which squeeze the fabric warp and fill elements together are preferably employed. The heat bond technique contemplates heating the woven goods to 150°–500°F. with the desired range being between 225° and 375°F, as noted, and then pressing the warp and fill strands together to effect bonding. In the moisture and solvent bonding techniques, the woven goods are passed through a chamber saturated with either moisture or solvent vapors, with the warp and fill strands then being squeezed together through the medium of squeeze rolls. The contact bond technique would require only that squeeze rolls be used to cause adherence between the warp and fill strands as the woven fabric is passed between the rolls.

In the case of moisture bonding, the various chemical compositions that can be used for the blockable coating 15 include polymers of acrylate-type (polyacrylic acid, polymethacrylic acid, etc.); polyacryl amide; casein; polyvinyl alcohols (partially or fully hydrolyzed); dextrin; low molecular weight polyvinyl pyrrolidone; carboxy cellulose esters and ethers; high molecular weight polyethylene glycols; water soluble or water swellable natural gums.

The degree of moisture sensitivity can be controlled by blending one or more of the aforementioned ingredients with materials with less moisture sensitivity such as polyvinyl acetate; acrylic esters; styrene homopolymers and copolymers; polyesters; epoxy resins.

Suitable contact adhesives for contact bonding of warp and filler strands include vinyl ethyl ether resins; plasticized polyvinyl acetate; low molecular weight styrene-butadiene latex and even paraffin waxes.

The FIG. I system is typical of that used for producing the distortion resistant unidirectional glass fiber tape or webbing of the instant invention through a heat bonding process. As indicated in FIG. I, appropriately spaced warp strands 14 are continuously payed out from spools 27 over the guide 22 then directed through the shuttle 23, and then fed between the heated pressure rolls 24 to a take up reel 28 in a manner well known in the art. As the individual warp strands 14 to which a heat bondable blockable coating 15 has been previously applied are fed under appropriate tension from guide 22 to reel 28, the shuttle 23 interweaves the groups or bundles 16 of fill elements 17 with the warp strands 14 to form the net-like webbing. The interweaving mechanism may be any one of a number of mechanisms well known in the art (e.g. a standard rapier mechanism or a shuttle mechanism) and does not form part of the invention.

As the webbing 10 is advanced through the heated rolls 24 warp and weft strands 14 and 17 are heated and the blockable surface coating 15 of the warp strands 14 plasticizes. At the same time the criss-crossed and interwoven strands 14 and 17 are selectively pressed together without being crushed until the weft or filler elements 17 become firmly embedded in the softened coating 15 of warp strands 14 under the application of pressure from rolls 24. The embedded configuration may be seen from FIG. III. As the webbing 10 leaves rolls 24 and the warp coating 15 cools and solidifies, the warp strands 14 and weft strands 17 become interlocked.

The mechanical locking or bonding of the warp and fill strands 14 and 17 as aforedescribed is particularly useful in producing distortion resistant glass fiber tape material of a very low warp to fill weight ratio and which otherwise would be readily susceptible to distortion and would literally fall apart. By virtue of this invention, unidirectional glass fiber tape or fabric wherein the filler strands make up at least 90% of the overall weight of the tape can be commercially produced and used for plastic composite reinforcement purposes.

FIG IV illustrates a production line for incorporating the tape 10 into a seamless plastic pipe 30. The basic elements of the production line comprise a pay-out reel device 32, a dip coating station 34 and a mandrel station 36. Dip coating station 34 comprises an appropriately heated tank 38 for a coating bath 39 along with a series of idler coating rolls 40 through which glass fiber tape 10 is threaded. The bath material 39 may comprise a suitable thermoplastic or thermosetting material.

As the web 10 moves through rolls 40, it is caused to be immersed in bath 39 and the entire web 10 including both warp strands 10 and filler strands 17 becomes uniformly coated on each side with a coating of plastic fill material. From the bath 34 the partially hardened plastic composite, designated 44, comprised of the coating of fill material and the web 10 is directed towards and helically wound about a mandrel 46 at the station 36.

In helically winding the successive leading portions of the plastic composite 44 about the mandrel 46 adjacent edges of the generally longitudinally aligned filler strands 17 of adjoining helical portions of the web are preferably abutted to form a continuous helical joint 48. As the composite 44 is helically wound about rotating mandrel 46, it is progressively advanced along the mandrel. When the leading edge of the plastic composite 44 reaches the terminal extremity of mandrel 46, the composite will have sufficiently polymerized to provide a generally seamless plastic pipe 30, as shown in FIGS. V and VI, with the opposing edges of the composite 44 making up the seams or joint 48 having generally merged and coalesced together so as to form a smooth outer surface.

In the above pipe product example, it will be noted that the main filler strands 17 of the webbing were generally oriented or aligned with the longitudinal axis of the final pipe produce, i.e. they were arranged in a direction where they would function most efficiently as a reinforcement element without becoming dislodged from the carrier warp strands 14.

In the above and other product examples, since tape 10 has a relatively low warp to weft strand weight ratio due to the spaced arrangement of individual warp strands which extend lengthwise of the tape 10, it is relatively pliant and can be readily flexed about and along its longitudinal axis without distorting the webbing or materially affecting the mechanical interlock between warp and filler or weft strands. Depending upon the ultimate strength requirements for a given tape 10 each bundle 16 will be made up of more or less individual strands 17 and/or adjacent bundles or groups 16 will be spaced further apart or closer together.

One example of a relatively distortion resistant tape 10 used for plastic seamless pipe comprised a tape wherein parallel arranged warp strands 14 were spaced from each other at about nine-sixteenth inch while adjacent bundles 16 of filler strands 17 were spaced from each other on the order of three-sixteenth inch on centers so as to form an interstice 20 having the dimensions of about one-half × one-sixteenth inch. The individual strands 17 of the groups 16 and the warp strands 14 in their uncoated state had a diameter on the order of 0.003 to 0.006 inch and each such final warp strand 14 was made up of a series of helically wound glass fiber filaments wherein each filament had a diameter on the order of 0.0003 to 0.0006 inch. A coating 15 of approximately 0.002 to 0.004 inch thickness was substantially uniformly applied to the exterior surface of each warp strans 14 along its full length. The individual strands 17 were made up of filaments of glass fiber.

It is also to be understood, of course, that the overall width and length of webbing 10 in any given case will be dependent upon the results desired as well as upon the limitations of the equipment involved in producing the webbing 10 and incorporating it in a final article of manufacture. Inasmuch as the warp and weft elements 14 and 17 respectively of tape 10 are of relatively minute size and relatively lightweight, e.g., on the order of about 1 pound per 3000 yards of strand length, the overall lightweightness of webbing 10 contributes to its pliability and handling in addition to location of the major portion of the glass fibers in the fill or weft portion of the woven fabric.

In another advantageous embodiment of the instant invention the woven fabric or webbing of the invention can have a slightly modified composite construction, such as is shown in FIGS. VIII, IX and IXA. In this case, the webbing, designated 50, comprised of the usual warp strands 14 and bundles or groups 52 of individual glass fiber filler elements 54. Each filler element 54 is coated with a substantially uniform moisture-resistant coating 56 throughout its length and can comprise a single monofilament core 55 a shown in FIG. IX or a core 55a made up of a number of twisted monofilaments as shown in FIG. IXA. The moisture-resistant coating 56 can be composed of synthetic and/or natural polymers. Suitable materials include among others, polyacrylates, polyacrylate esters, epoxy resins, polyesters, polyvinyl compositions, polyethylene glycol, polystyrene (homo and copolymers). As particularly suitable moisture resistant coating materials polyesters and epoxy-type resins can be employed with excellent results. Since webbing 50 has filler elements 54 provided with moisture resistant coatings the resultant moisture resistant characteristic of the overall woven fabric tape or webbing will automatically be imparted to some extent to any product in which the webbing is incorporated.

Advantageous embodiments of the instant invention have been shown and described and various changes can be made therein without departing from the appended claims.

What is claimed is:

1. A method of manufacturing unidirectional glass fiber webbing having a low warp to fill weight ratio, said method comprising loosely weaving weft bundles of glass fiber rovings comprised of uncoated fine glass fiber fill elements in retiform construction in a fill to warp weight ratio of 90% or more with multi-filament synthetic fiber warp strands spaced from one another by about one-half inch and coated with a substantially uniform blockable coating having a thickness of 0.002 to 0.004 inches, said coating being thermoplastic and selected from the group consisting of vinyl chloride, vinyl acetate and vinyl pyrrolidene polymers, and thereafter holding the woven elements and strands in engagement with one another while elevating the temperature of the coating to activate the coating and bond the fill elements and warp strands together therethrough.

2. A method of manufacturing unidirectional glass fiber webbing of the type having a set of warp strands and a set of weft strands that intersect said warp strands at intersections and in which the strands in one set are glass fiber rovings comprised of fine uncoated glass fiber elements and substantially exceed those in the other set in number and total weight and the strands in the other set are spaced relative to one another and comprise multifilament synthetic fiber, said method comprising the steps of coating said other set of strands with a substantially uniform coating of thermoplastic material having a thickness of 0.002 to 0.004 inches and selected from the group consisting of vinyl chloride, vinyl acetate and vinyl pyrrolidene polymers, weaving said sets of strands in a webbing, while the coating is in a non-adherent condition, wherein the strands in said one set make up 90% or more of the total weight of the webbing and the strands in said other set are spaced relative to one another by about one-half inch, and thereafter holding the woven strands in engagement with one another while elevating the temperature of the coating to effect a bond between the intersecting strands at the intersections thereof.

3. A method, according to claim 2, wherein said holding step comprises the step of pressing the strands of respective sets together at the intersections.

4. A method, according to claim 3, wherein said pressing step comprises the steps of providing a pair of rollers supported in parallel closely spaced relation to define a bite therebetween and passing the woven strands through said bite.

* * * * *